United States Patent

[11] 3,544,063

[72] Inventors Percy Barlow, General Delivery,
Griffin, Saskatchewan, Canada,
and Roderick Bruce Barlow,
881 9th Ave., NE., Swift Current,
Saskatchewan, Canada
[21] Appl. No. 772,227
[22] Filed Oct. 31, 1968
[45] Patented Dec. 1, 1970
[32] Priority Oct. 31, 1967
[33] Great Britain
[31] No. 49350/67

[54] HYDRAULIC HOSE COUPLING CONNECT AND DISCONNECT DEVICES
15 Claims, 6 Drawing Figs.
[52] U.S. Cl. .................................................. 251/149.9;
285/1, 285/84, 285/119, 285/137
[51] Int. Cl. ...................................................... F16l 37/28

[50] Field of Search............................................ 251/89.5,
149.9; 285/1, 137, 119

[56] References Cited
UNITED STATES PATENTS
| | | | |
|---|---|---|---|
| 2,457,478 | 12/1948 | Letvin............................ | 285/137X |
| 2,538,259 | 1/1951 | Merriman....................... | 285/1X |
| 2,783,064 | 2/1957 | Johnson et al. ................ | 285/1 |
| 2,919,144 | 12/1959 | Lindenmeyer................. | 251/149.9X |
| 3,084,713 | 4/1963 | Parrish.......................... | 251/149.9X |

Primary Examiner—Robert G. Nilson
Attorney—Kent & Ade

ABSTRACT: This invention consists of an hydraulic hose coupling a connecting device which includes a manual lock which will only break away when a predetermined tension has been exceeded. It also includes a valve which releases a static hydraulic pressure within the lines prior to connecting and disconnecting the coupling.

Patented Dec. 1, 1970
3,544,063
Sheet 1 of 2
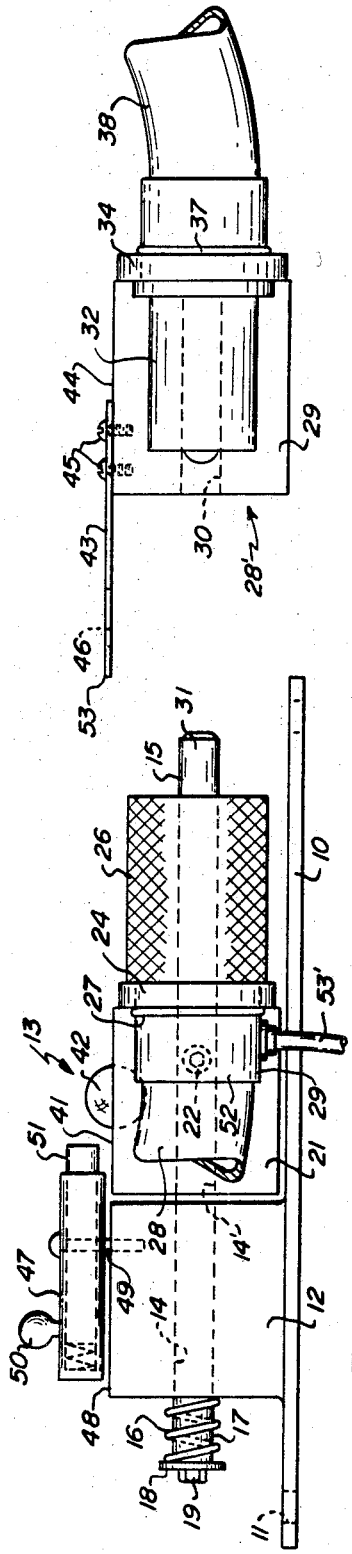
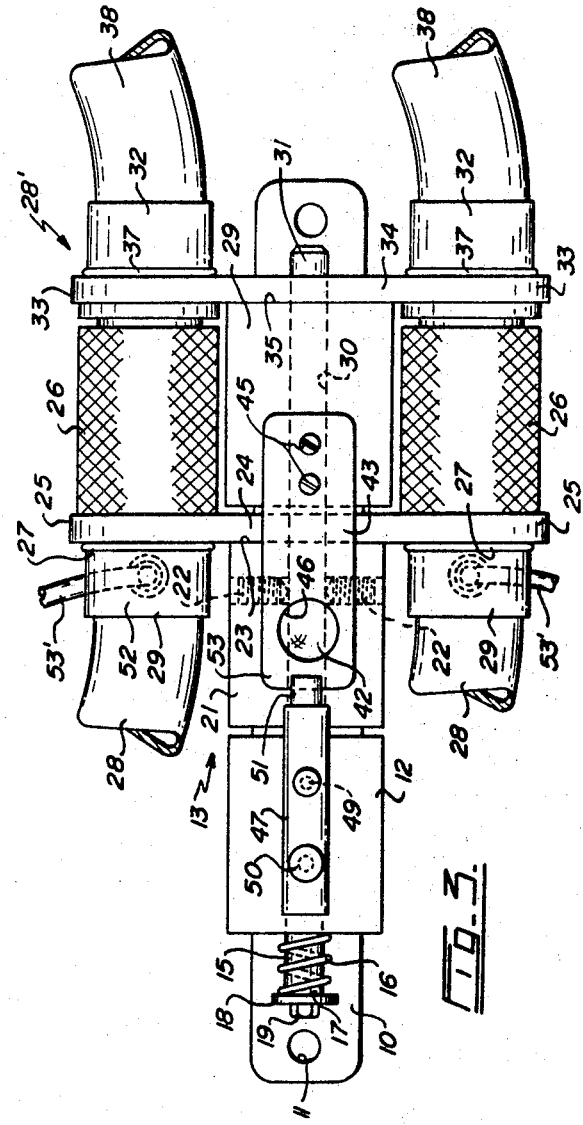
INVENTORS
PERCY BARLOW AND
RODERICK BRUCE BARLOW
By
Kent & Ade

HYDRAULIC HOSE COUPLING CONNECT AND DISCONNECT DEVICES

This invention relates to new and useful improvements in hose coupling connecter and disconnecter devices such as used with a prime mover towing a vehicle or piece of equipment which utilizes hydraulic controls routed from the main hydraulic system of the prime mover.

As an example, a tractor pulling a piece of farm equipment which is hydraulically operated may be considered.

It is conventional to have some method of disconnecting the hydraulic supply from the tractor to the implement so that the implement can be connected and disconnected to the tractor without the necessity of involved hydraulic hose and couplings. The conventional device consists of a pair of hydraulic hoses leading from the hydraulic supply of the tractor, to a pair of connecter couplings which in turn may be selectively connected or disconnected to corresponding couplings attached to the piece of equipment being operated by the tractor. These couplings usually involve male and female connections with spring-loaded ball valves incorporated therein in order to avoid loss of oil or fluid when connecting and disconnecting.

It is also desirable and usual to have some method whereby the hose couplings can disconnect if, by chance, the piece of equipment breaks away from the towing unit thus avoiding damage to the hydraulic hoses and the like.

The principal disadvantage of conventional devices are as follows:

1. Due to the extremely high pressures involved with hydraulic equipment, it is very difficult to connect and disconnect the couplings as the ball valves have to be lifted against the hydraulic pressure in order that the coupling can be operated. This occurs even when the hydraulic system is not operative due to the static hydraulic pressure within the lines.
2. There is nearly always a loss of fluid when connecting and disconnecting due to the extremely high pressures involved.
3. Also due to the extremely high pressures involved, conventional couplings suffer from excessive leakage.

It is conventional for an operator to attempt to relieve the pressure within the lines before connecting the couplings from the piece of equipment and this is done by pushing against the ball valves with a screwdriver or the like. This not only loses hydraulic fluid, but also damages the ball valves thus destroying the seal.

The present device overcomes all of these disadvantages by permitting couplings to be connected and disconnected readily and easily due to the fact that the hydraulic pressure can be relieved prior to connecting and disconnecting.

Furthermore, it involves a novel construction of breakaway coupling which is positively locked until a predetermined pressure has been placed on the junction whereupon the coupling releases easily and smoothly.

The device can be adapted for use with any type of hydraulic couplings and/or breakaway devices.

With the foregoing considerations in view, and such other objects, purposes or advantages as may become apparent from consideration of this disclosure and specification, the present invention consists of the inventive concept which embraces or includes the method, process, construction, arrangement of parts, or new use of any of the foregoing, as herein particularly exemplified in one or more specific embodiments of such concept, reference being had to the accompanying FIGS. in which:

FIG. 1 is a side elevation of the first portion of our device.

FIG. 2 is a side elevation of the second portion of our device.

FIG. 3 is a top plan view of FIGS. 1 and 2 connected together.

In the drawings like characters of reference indicate corresponding parts in the different FIGS.

Figure 4:
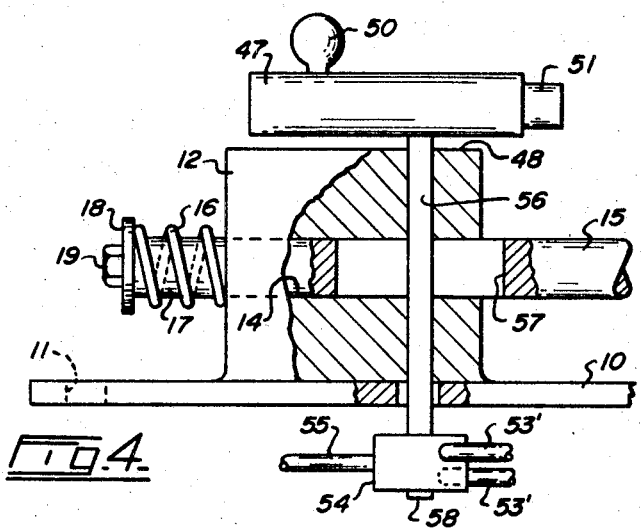
FIG. 4 is a fragmentary partially schematic view showing an alternative embodiment of the first portion.

Proceeding therefore to describe the invention in detail, reference character 10 illustrates a base plate or strap which may be secured to the prime mover or source of power such as a tractor by means of bolts passing through apertures 11 in one end thereof.

Mounted on this plate is a block 12 forming part of the first portion of the device which is collectively designated 13. This block is longitudinally apertured as at 14 and is preferably welded to plate 10.

A shaft 15 extends through aperture 14 and is movable lengthwise within limits. A compression spring 16 encircles one extending end 17 of the shaft and is held in position by means of washer 18 and bolt 19, said spring reacting between the washer 18 and the end 20 of the block 12.

Secured to shaft 15 is a further block 21 also longitudinally apertured as at 14', said block being secured to the shaft by means of lock or set screws 22. From the foregoing it will be appreciated that block 21 together with shaft 15 can be moved endwise within block 12 against pressure of spring 16.

Secured to the front face 23 of block 21 is a transversely situated plate 24 extending upon each side of block 21. This plate is apertured to permit the passage therethrough of shaft 15.

The wings or transverse extensions 25 of the plate 24 are apertured to receive conventional female hydraulic couplings 26 which may be floatably and flexibly secured thereto by means of lock washers 27 engaging annular grooves (not illustrated) around the reduced diameter of the coupling extending through the apertures in the extensions 25.

Main pressure line hoses 28 are connected to the rear ends 29 of these couplings 26 in the usual way.

The second portion of the device collectively designated 28 consists of a block 29 longitudinally apertured as at 30, said aperture being adapted to slidably receive the end 31 of shaft 15.

Male portions 32 of the couplings 26 are secured to the transverse wings 33 of a transverse strap or plate 34 secured to the front end 35 of block 29. These are conventional and may be flexibly held within the wings 33 by means of lock washers 37 as hereinbefore described with reference to the female portions of the couplings.

High pressure hoses 38 extend from the coupling portions 32 and are secured thereto in the conventional manner.

In operation, insofar as conventional connections are concerned, the portion 28' is engaged with the portion 13, shaft 15 entering aperture 30 to guide the coupling portion 32 into engagement with the coupling portion 26.

Figure 6:
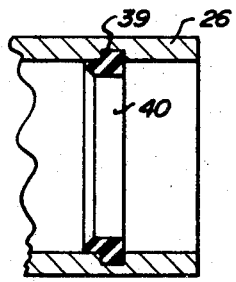
FIG. 6 is an enlarged fragmentary sectional view of one of the couplings showing the U-shaped seal preferred.

FIG. 6 shows the internal construction of the sleeve portion of coupling 26 which is provided with an annular groove 39 to receive a U-shaped washer 40. We have found that this construction of washer is much more efficient for sealing high pressure fluids than the conventional O-rings.

Recessed within the upper side 41 of block 21 is a steel ball 42, approximately half of this ball standing or extending above the surface 41. A resilient plate 43 is secured to the upper side 44 of block 29, by screws or bolts 45 and this plate extends rearwardly of the block. The plate is apertured as at 46 and when the portion 28 is engaged with the portions 13, the aperture 46 engages around the extending portion of the ball 42. It will be appreciated that lengthwise movement of the portion 28 will cause the resilient plate 43 to raise sufficiently to disengage from ball 42. However, this is prevented normally by means of locking lever 47 pivoted to the upper side 48 of block 12 by means of pivot pin 49 and moved by operating knob 50. An extending end 51 of the locking lever 47 is adapted to overlie the end 53 of the resilient plate 46 when the assembly is locked together as shown in FIG. 3. This portion 51 overlying the end of the resilient lever or plate 46 prevents the resilient plate from lifting so that the portions cannot become disconnected. However, continuing lengthwise pressure between the portions 28 and 13 such as may be effected by implement breakaway, causes the block 21 which is secured to rod or shaft 15, to move lengthwise within block 12 against pressure of spring 16. This movement is sufficient to disengage the end 53 of plate 43 from the end 51 of the locking lever thus permitting the plate to lift clear of the ball 42 and the portions to become disconnected. By adjusting the tension of spring 16, the breaking tension of the coupling can be controlled within limits.

Figure 5:
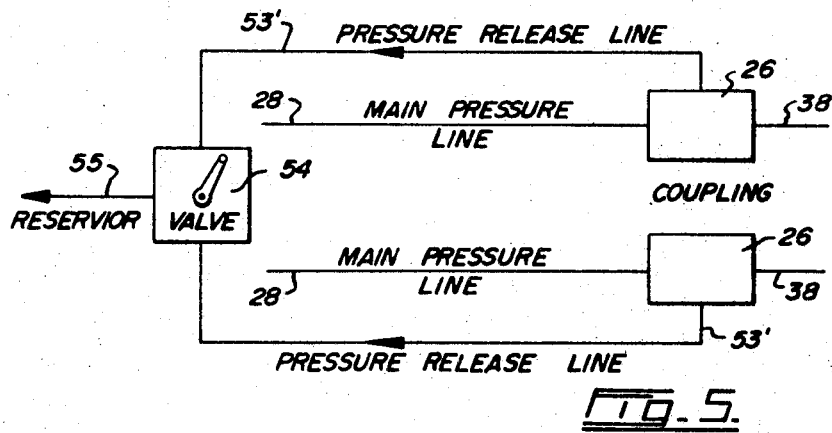
FIG. 5 is a schematic hydraulic diagram of the system.

Connected to both portions of the rear ends 52 of the couplings 36, is a further hydraulic coupling and hose 53'. These hoses 53' extend to a valve unit 54 as shown schematically in FIG. 5 and a further line or hose 55 extends from the valve to the reservoir of the hydraulic system (not illustrated). When the valve is in the closed position, fluid cannot flow from the couplings through the valve to the reservoir and the hydraulic system works in the conventional manner. However, when it is desired to connect or disconnect the portions 13 and 28, it is desirable to relieve the static hydraulic pressure at these couplings. Under these circumstances, the valve 54 is operated so that the pressure relief lines or hoses 53' are connected through the valve directly to the reservoir through line 55 so that any pressure within the main pressure lines 28 is immediately released thus allowing the couplings to be operated easily.

This valve 54 can either be situated remotely and connected by means of the hoses 53' or, alternatively, and preferably, connected with the locking lever 47 hereinbefore described. FIG. 4 shows one embodiment of the desired modification in which the pivot shaft 56 of the locking lever 47 extends downwardly through a drilling within block 12. It will be appreciated that shaft 15 has to be slotted as at 57 to permit the pivot shaft 56 to pass therethrough and also to permit shaft 15 to move endwise within block 12 as hereinbefore described.

The lower end 58 of the pivot shaft 56 can be connected directly to the valve 54 and arranged so that when the locking lever 47 is in the position shown in the accompanying drawings, the pressure relief lines 53' are shut off from the reservoir, but when this lever is turned for connecting and disconnecting the coupling, the pressure relief lines 53' are connected to the reservoir 55 thus relieving the pressure within the lines.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

We claim:

1. In an hydraulic coupling assembly which includes a female coupler with hydraulic hoses attached thereto and a male coupler with hydraulic hoses attached thereto, said couplers being connectable and disconnectable, mounting means for said female coupler and mounting means for said male coupler, guide means cooperating between said mounting means to guide said male and female couplers into engagement with one another, further means cooperating between said mounting means to selectively lock said couplers into engagement with one another against disengagement below a predetermined breakaway tension, said mounting means for said female coupler including a base plate, a longitudinally apertured block secured to said plate, a shaft extending through said block for endwise movement within limits, a further block secured to said shaft and a transverse plate secured to said further block, said female coupler being mounted on said plate.

2. The device according to claim 1 in which said mounting means of said male portion of said coupler includes a longitudinally apertured block, and a transverse plate secured to said block, said male portion of said coupler being mounted on said plate.

3. The device according to claim 2 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to the associated hydraulic reservoir, said valve, in the open position, connecting said coupler with said reservoir for excess fluid dumping, said valve, when in the closed position, closing off the connection to said reservoir.

4. The device according to claim 2 in which said guide means includes said shaft engaging within said apertured block of said mounting means for said male coupler when said couplers are being engaged one with the other.

5. The device according to claim 4 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to the associated hydraulic reservoir, said valve, in the open position, connecting said coupler with said reservoir for excess fluid dumping said valve, when in the closed position, closing off the connection to said reservoir.

6. The device according to claim 4 in which said means to selectively lock said couplers together includes an apertured resilient strap secured by one end thereof to said block of said male coupler and means on said further block engageable by the aperture in the distal end of said strap when said couplers are engaged with one another, and a manual locking lever on one of said blocks, the end of said lever overlying said distal end of said strap when said lever is in the locked position thereby preventing disengagement of said distal end from said means of said further block.

7. The device according to claim 6 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to the associated hydraulic reservoir, said valve, in the open position, connecting said coupler with said reservoir for excess fluid dumping, said valve, when in the closed position, closing off the connection to said reservoir, a pivot rod for said locking lever, said valve being operatively secured to said pivot rod whereby when said locking lever is open, said valve is open and vice versa.

8. The device according to claim 6 which includes spring loaded means reacting between said shaft and said first mentioned block on said female coupler, said spring loaded means resisting endwise movement of said shaft below a predetermined breakaway tension, said spring loaded means permitting limited endwise movement of said shaft when said predetermined breakaway tension is reached or exceeded thereby permitting said distal end of said strip to disengage the end of said lever so that said strip disengages from said means on said further block.

9. The device according to claim 8 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to the associated hydraulic reservoir, said valve, in the open position, connecting said coupler with said reservoir for excess fluid dumping, said valve, when in the closed position, closing off the connection to said reservoir, a pivot rod for said locking lever, said valve being operatively secured to said pivot rod whereby when said locking lever is open, said valve is open and vice versa.

10. The device according to claim 5 in which said means to selectively lock said couplers together includes an apertured resilient strap secured by one end thereof to said block of said male coupler and means on said further block engageable by the aperture in the distal end of said strap when said couplers are engaged with one another, and a manual locking lever on one of said blocks, the end of said lever overlying said distal end of said strap when said lever is in the locked position thereby preventing disengagement of said distal end from said means of said further block.

11. The device according to claim 10 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic lines means extending from said valve to the associated hydraulic reservoir, said valve, in the open position, connecting said coupler with said reservoir for excess fluid dumping, said valve, when in the closed position, closing off the connection to said reservoir, a pivot rod for said locking lever, said valve being operatively secured to said pivot rod whereby when said locking lever is open, said valve is open and vice versa.

12. The device according to claim 10 which includes spring loaded means reacting between said shaft and said first mentioned block on said female coupler, said spring loaded means resisting endwise movement of said shaft below a predetermined breakaway tension, said spring loaded means permitting limited endwise movement of said shaft when said predetermined breakaway tension is reached or exceeded thereby permitting said distal end of said strip to disengage the end of said lever so that said strip disengages from said means on said further block.

13. The device according to claim 12 which includes means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to the associated hydraulic reservoir, said valve, in the open position, connecting said coupler with said reservoir for excess fluid dumping, said valve, when in the closed position, closing off the connection to said reservoir, a pivot rod for said locking lever, said valve being operatively secured to said pivot rod whereby when said locking lever is open, said valve is open and vice versa.

14. In an hydraulic coupling assembly which includes a female coupler with hydraulic hoses attached thereto and a male coupler with hydraulic hoses attached thereto, said coupler being connectable and disconnectable, mounting means for said female coupler and mounting means for said male coupler, guide means cooperating between said mounting means to guide said male and female couplers into engagement with one another, further means cooperating between said mounting means to selectively lock said couplers into engagement with one another against disengagement below a predetermined breakaway tension, and means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to an associated hydraulic reservoir, said valve, in the open position, connecting said coupler with said reservoir for excess fluid dumping, said valve, when in the closed position, closing off the connection to said reservoir.

15. In an hydraulic coupling assembly which includes a female coupler with hydraulic hoses attached thereto and a male coupler with hydraulic hoses attached thereto, said couplers being connectable and disconnectable, mounting means for said female coupler and mounting means for said male coupler, guide means cooperating between said mounting means to guide said male and female couplers into engagement with one another, further means cooperating between said mounting means to selectively lock said couplers into engagement with one another against disengagement below a predetermined breakaway tension, said mounting means of said male portion of said coupler including a longitudinally apertured block, and a transverse plate secured to said block, said male portion of said coupler being mounted on said plate, and means to relieve static hydraulic pressure within said coupler and hydraulic lines attached thereto prior to engagement and disengagement of said coupler portions, said last mentioned means including an hydraulic connection on said coupler, a valve, said hydraulic connection being operatively connected to said valve, and hydraulic line means extending from said valve to an associated hydraulic reservoir, said valve, in the open position, connecting said coupler with said reservoir for excess fluid dumping, said valve, when in the closed position, closing off the connection to said reservoir.